(12) United States Patent
Turner et al.

(10) Patent No.: US 8,028,098 B2
(45) Date of Patent: Sep. 27, 2011

(54) PEER TO PEER BROADCAST CONTENT SYNCHRONIZATION

(75) Inventors: Ian Bruce Turner, Shipley (GB); Gary John Porter, Shipley (GB)

(73) Assignee: Pace PLC, Shipley (GB)

( * ) Notice: Subject to any disclaimer, the term of this patent is extended or adjusted under 35 U.S.C. 154(b) by 0 days.

(21) Appl. No.: 12/387,415

(22) Filed: May 1, 2009

(65) Prior Publication Data

US 2009/0276543 A1 Nov. 5, 2009

(30) Foreign Application Priority Data

May 2, 2008 (GB) .................................. 0807990.7

(51) Int. Cl.
*G06F 15/16* (2006.01)
(52) U.S. Cl. ...................................................... 709/248
(58) Field of Classification Search .................. None
See application file for complete search history.

(56) References Cited

U.S. PATENT DOCUMENTS

2009/0300673 A1 * 12/2009 Bachet et al. .................. 725/31

FOREIGN PATENT DOCUMENTS

| WO | 2007/021725 | 2/2007 |
| WO | 2008/012488 | 1/2008 |

OTHER PUBLICATIONS

Louise Lamont, et al, "Synchronization of Multimedia Data For A Multimedia New-on-Demand Application"; IEEE Journal On Selected Areas In Communications, IEEE Service Center, Piscataway, US, vol. 14, No. 1, Jan. 1, 1996; ISSN: 0733-8716.

* cited by examiner

*Primary Examiner* — Moustafa M Meky
*Assistant Examiner* — Clayton R Williams
(74) *Attorney, Agent, or Firm* — Head, Johnson & Kachigian, P.C.

(57) ABSTRACT

A method and apparatus for synchronizing recorded broadcast content on a peer to peer system, in which portions of the content are synchronized between the peers by referring to program clock reference values.

11 Claims, 9 Drawing Sheets

| Node | Description |
|---|---|
| Synchronisation and directory server | Holds a list of all the peers and the content that they have recorded. To make the system more efficient the synchronisation information can be stored on the server, saving its recalculation |
| Tracker | A standard BitTorrent tracker, this can be seeded with content to provide performance boosts for some content |
| Downloading peer | The peer which wishes to download a piece of content, if another downloading peer joins the torrent swarm then this could become an uploading peer. |
| Uploading peer | A peer which contains content that the downloading peer wants to download |

FIG. 1A

| Node | Description |
|---|---|
| Synchronisation and directory server | Holds a list of all the peers and the content that they have recorded. To make the system more efficient the synchronisation information can be stored on the server, saving its recalculation |
| Tracker | A standard BitTorrent tracker, this can be seeded with content to provide performance boosts for some content |
| Downloading peer | The peer which wishes to download a piece of content, if another downloading peer joins the torrent swam then this could become an uploading peer. |
| Uploading peer | A peer which contains content that the downloading peer wants to download |

Conventional Chunking

Fixed size in bytes
ie. 1KB

All peers send a map of which chunks they hold

Effect of a lost chunk

Single lost Packet

FIG. 7

Midfile synchronisation

Fixed size in bytes
ie. 1KB

Processed to give chunk maps
All peers send a map of which chunks they hold

Effect of a lost chunk

Lost chunk detected in earlier stage    content unavailable for peer to peer sharing Single lost Packet

PEER TO PEER BROADCAST CONTENT SYNCHRONIZATION

CROSS REFERENCE TO RELATED APPLICATIONS

This United States Application claims priority to British Patent Application No. 0807990.7 filed 2 May 2008, which is incorporated herein by reference.

STATEMENT REGARDING FEDERALLY SPONSORED RESEARCH OR DEVELOPMENT

Not Applicable

THE NAMES OF THE PARTIES TO A JOING RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention to which this application relates is the synchronization of recorded broadcast content on a peer to peer system.

Peer to peer (P2P) systems are commonly used in computer networks to transfer files between clients by using the cumulative bandwidth of the participating clients. When a file is requested from the network by a client, it is received in small portions or chunks. Typically, as the bandwidth for uploading may only be 100 kb/s compared to a downloading bandwidth of say 4-5 Mb/s, the P2P system allows the uploading bandwidth to be aggregated to increase the download speed to a peer. A further advantage of P2P systems is that the transfer is more robust compared to the conventional method of transferring the file in one large download wherein the transfer may be aborted if the connection is lost during such transfer, thereby losing the portion downloaded so far. As the file is subdivided into small chunks in the P2P system, if the connection is aborted the portions of the file downloaded to date are not lost.

A number of P2P protocols are available, and BitTorrent is a commonly used one. In this protocol, a peer first creates a small file called a torrent which contains metadata about the files to be shared and about the tracker, the computer that coordinates the file distribution and tracks which peer has which portions. Peers that want to download the file first obtain a torrent file for it, and connect to the specified tracker, which tells them which other peers currently have the whole file or are downloading the same, so that pieces of the file can be obtained from the same.

Peers with the whole file are known as seeds, whereas the group of peers with portions of the file are known as a swarm. Peers can obtain file pieces from seeds or from other peers in the swarm, which improves the download speed as more chunks become shared in the swarm.

While BitTorrent works effectively with identical files, there is a significant problem in using P2P technology to share broadcast recordings, of the type that may be created by a broadcast data receiver (BDR).

This is because P2P protocols expect to work on perfect copies of the same file, as they chunk up the files at arbitrary points based on the number of bytes, such that the same chunks are created to allow receipt of the same chunk from multiple peers.

However, broadcast recordings generally do not produce identical copies because, for example, recordings on different BDRs may start and/or finish at different times due to variations in real time clocks on the BDRs.

In addition, packets can be lost mid-recording, for example due to uncorrected broadcast errors, poor reception, or from problems within the BDR delaying writing of content to the hard disk which can cause data loss. Even the loss of a single packet can cause problems for the P2P protocols as the chunk boundaries will be affected, thereby losing identity with the other chunks in the swarm.

BRIEF SUMMARY OF THE INVENTION

An aim of the present invention is to provide a way of synchronizing broadcast content via a peer-to-peer protocol which overcomes the above issues.

In one aspect of the invention, there is provided a method of synchronizing content comprising the steps of:
  receiving content via a broadcast data receiver, said broadcast data receiver connected to a network of one or more peers of further broadcast data receivers;
  storing the content on storage media;
  allowing one or more received portions of the content to be shared by the peers;
  characterized in that at least one portion is synchronized between the peers by referring to program clock reference values.

Program Clock Reference (PCR) values are defined by the MPEG2 specification such that each broadcast signal contains them and allows the transmitter and receiver to synchronies clocks. Typically the PCR value increases sequentially every 0.1 seconds.

Typically the PCR values monotonically increase, which, over a suitable period of time, is useful for indicating sequence and order of the content. Typically the PCR values are regularly (although not necessarily uniformly) dispersed through the stream of content received by the broadcast data receiver.

The invention utilizes these values to time-synchronies recordings on different BDRs to allow P2P sharing of the same.

In one embodiment, the receiving BDR determines the earliest and/or latest PCR for the content available from the peers.

In one embodiment the receiving BDR calculates a predetermined period from the earliest and/or latest PCRs available to determine common start and/or end points respectively.

Typically the predetermined period is around 60 seconds although it will be appreciated that any suitable period could be used.

Typically the start and/or end points are sent to the peers, thereby defining the content to be made available by the peers in a swarm and allowing the same to be synchronized.

Thus setting the start point at a position in the content a predetermined period from the earliest PCR, ensures that multiple peers have the same section of the content available. In other words, the positioning compensates for content which may be offset between peers. The distal ends of any content outwith the start and end points may be discarded. The content is thus aligned between the peers.

Typically a peer is marked as unavailable if it is unable to synchronies the start and/or end points.

In a further embodiment the start and/or end points are defined directly by the earliest and/or latest PCRs available respectively. This embodiment allows the maximum amount of content to be accessed but fewer peers would have the content at the start and end points, which would increase load on the peers with such content.

Typically the storage media is in the form of a hard drive, but it will be appreciated that any suitable writeable media could be used.

Typically the available content is divided into portions in which the boundaries therebetween are spaced apart by a predetermined value.

In one embodiment the predetermined value is a fixed portion or chunk size such as 1000 bytes.

Conventionally, a disadvantage to dividing the portions according to a fixed size is that if a packet is lost from a portion, subsequent portions have to be discarded as all of the subsequent boundaries are affected, the subsequent portions thereby losing identity with other peers in the swarm.

However, such errors can be overcome by examining the PCR values at the start of each portion. If for example one of the peers has a portion in which the start PCR is higher than that of the other peers, it is likely that such a portion has lost a packet.

In one embodiment, the PCR values at the start of each portion of each peer are monitored.

Typically, if a difference in PCR value is detected in one or more of the portions, the receiving BDR sends the difference to the corresponding peer such that subsequent portions can be offset by said difference.

Typically the peer with the least dropped packets is assigned as a reference peer against which other peers are compared for determining if there are differences in PCR values.

Thus in contrast to regular P2P protocols, portions following an error are not unavailable and can still be used in the swarm. In other words, the peer error can be recovered via mid-file synchronization.

In a further embodiment the predetermined value is a fixed time period such as 10 seconds.

In this embodiment the boundaries are at regular intervals based on PCR values. Advantageously, such temporal division is robust against packet loss, as the peers will be synchronized at the next boundary following a packet error.

In one embodiment the PCR values are stored in an index file, typically in the form of recorded metadata. This allows direct access to the boundaries rather than having to search the file for the boundaries.

Typically if the size of a portion reaches a threshold size, the portion will be subdivided into smaller portions. Thus, as the portions are divided according to a time value, and the resulting portions can vary in size, if any portions are deemed to be unmanageably large they can be split into smaller parts.

In a further aspect of the invention, there is provided a broadcast data receiver comprising:
  receiving means for receiving broadcast content
  communication means for connecting to a network of one or more peers of further broadcast data receivers;
  storage means for storing the content;
  processing means for dividing the content into one or more portions;
  characterized in that the received portions of the content may be shared by the peers, at least one portion being synchronized between the peers by referring to program clock reference values.

In a yet further aspect of the invention, there is provided a method of synchronizing content comprising the steps of:
  receiving content via a receiver;
  storing the content;
  allowing one or more received portions of the content to be shared by at least one further receiver;
  characterized in that at least one portion is synchronized between the receivers using program clock reference values.

Further steps of the method may be implemented in accordance with other features described herein.

BRIEF DESCRIPTION OF THE DRAWINGS

Specific embodiments of the invention are now described wherein.

DETAILED DESCRIPTION OF THE INVENTION

Figure 1A:
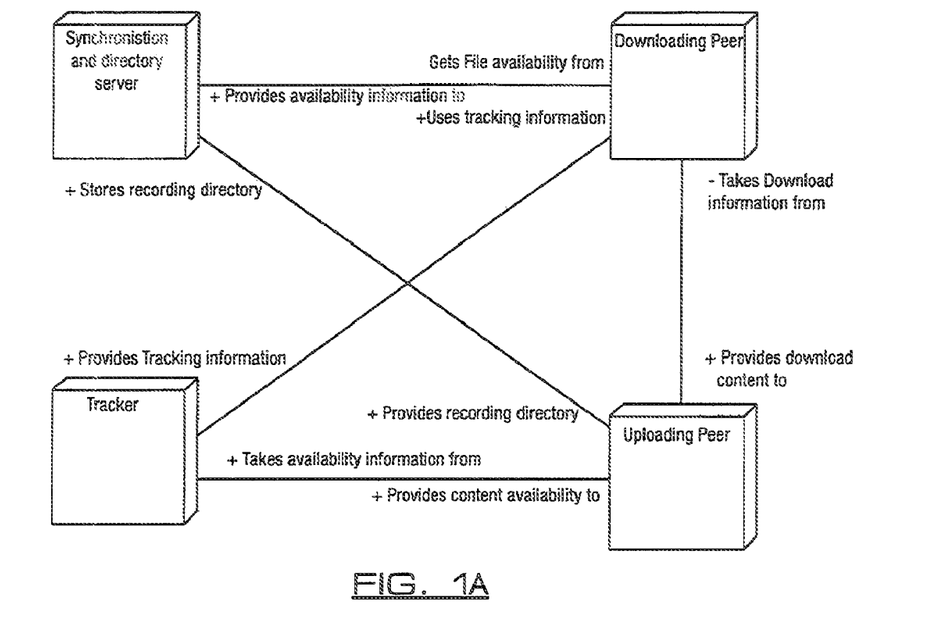
FIGS. 1A and 1B illustrate a deployment diagram of a peer to peer system.
Figure 1B:
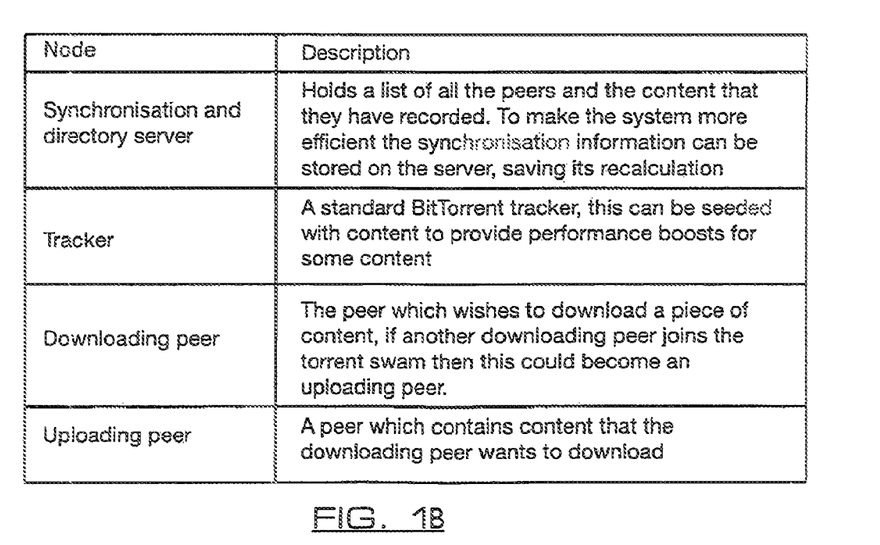

With reference to FIG. 1A, there is illustrated a deployment diagram with a brief description of each of the nodes in FIG. 1B. Of course if a swarm is already running for a piece of content then the downloading peer will simply join the swarm rather than performing a second synchronisation.

Figure 2:
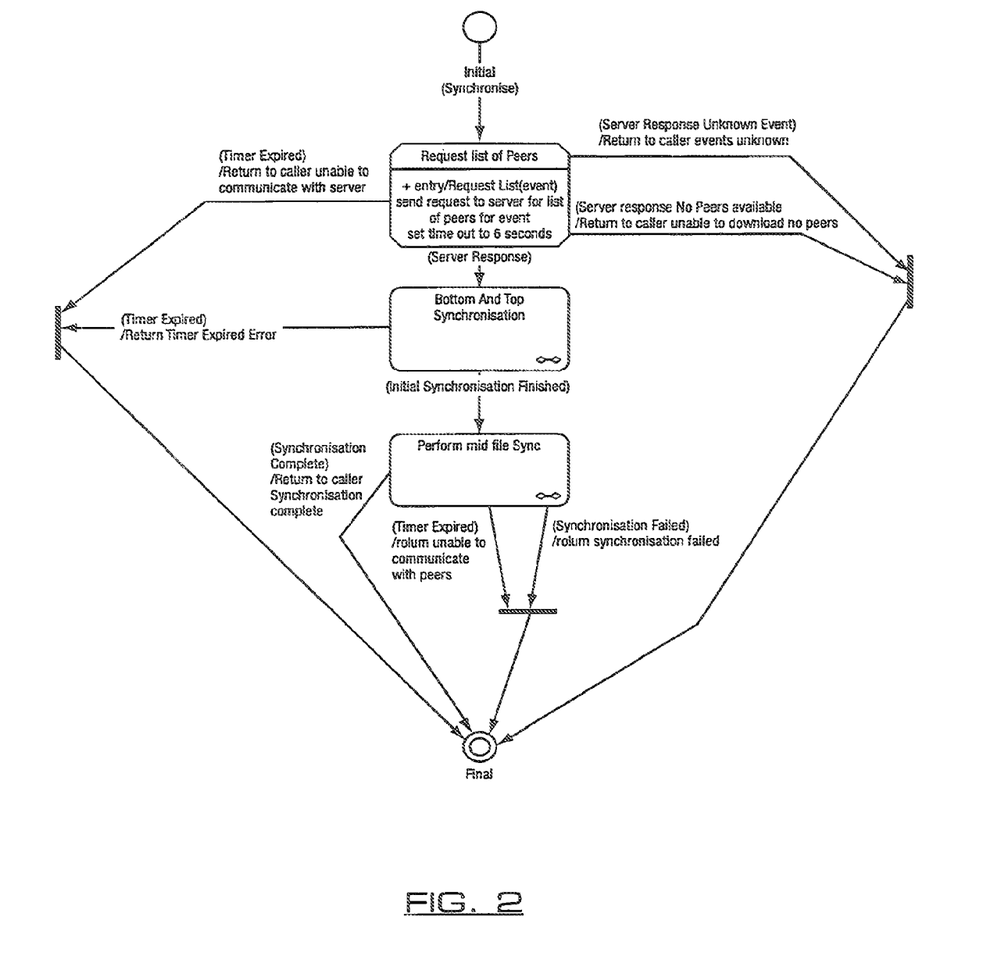
FIG. 2 illustrates an outline flow diagram for a method of synchronizing content using a peer to peer system according to an embodiment of the invention.

With reference to FIG. 2, the overall method of synchronizing broadcast content is illustrated, using a two stage synchronization process.

Figure 3:
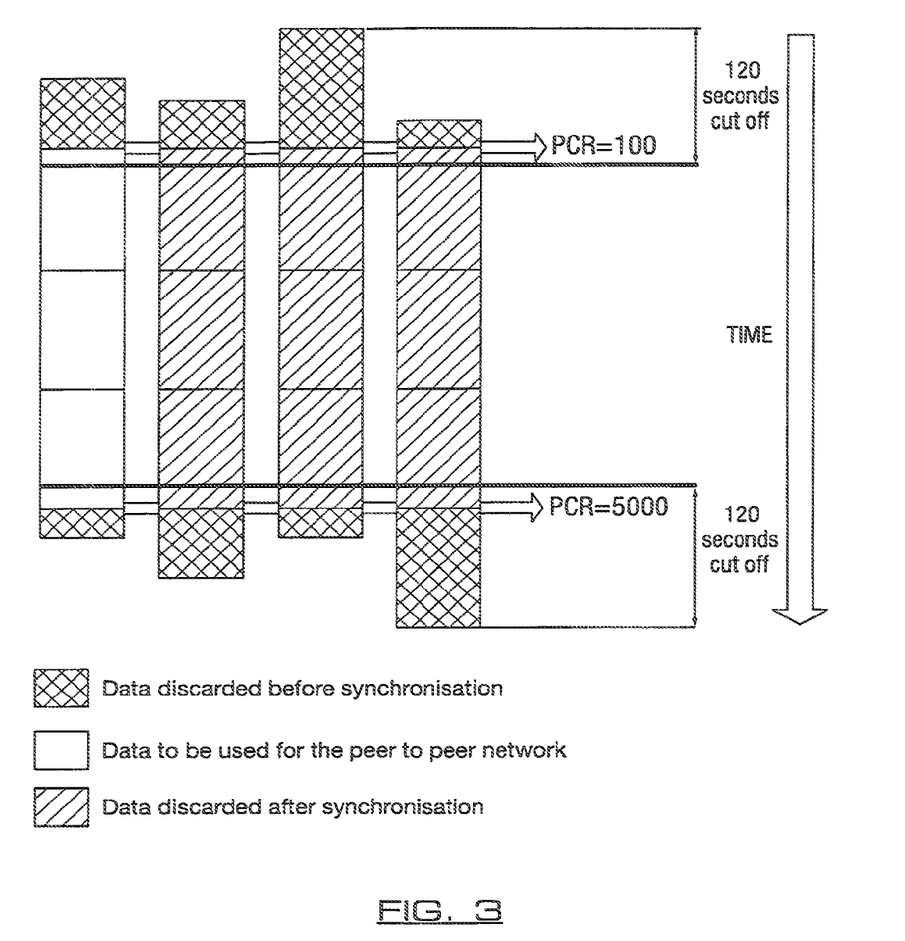
FIG. 3 illustrates the initial synchronization step of the method according to an embodiment of the invention.

With reference to FIG. 3 and the initial synchronization, each of the uploading peers provides both its first and last PCR value for the content. The downloading peer looks for the earliest PCR value provided by the uploading peers, and then determines the point a predetermined period of say 120 seconds on from this value, which is the cut off value for the first PCR. The latest PCR which is before the cut off time is selected as the start of the recording. At the end of the file the reverse is done, the latest PCR value is found and 120 seconds taken off the PCR time, which is the cut off time. The latest PCR value which is after the cut off time is selected.

Figure 4:
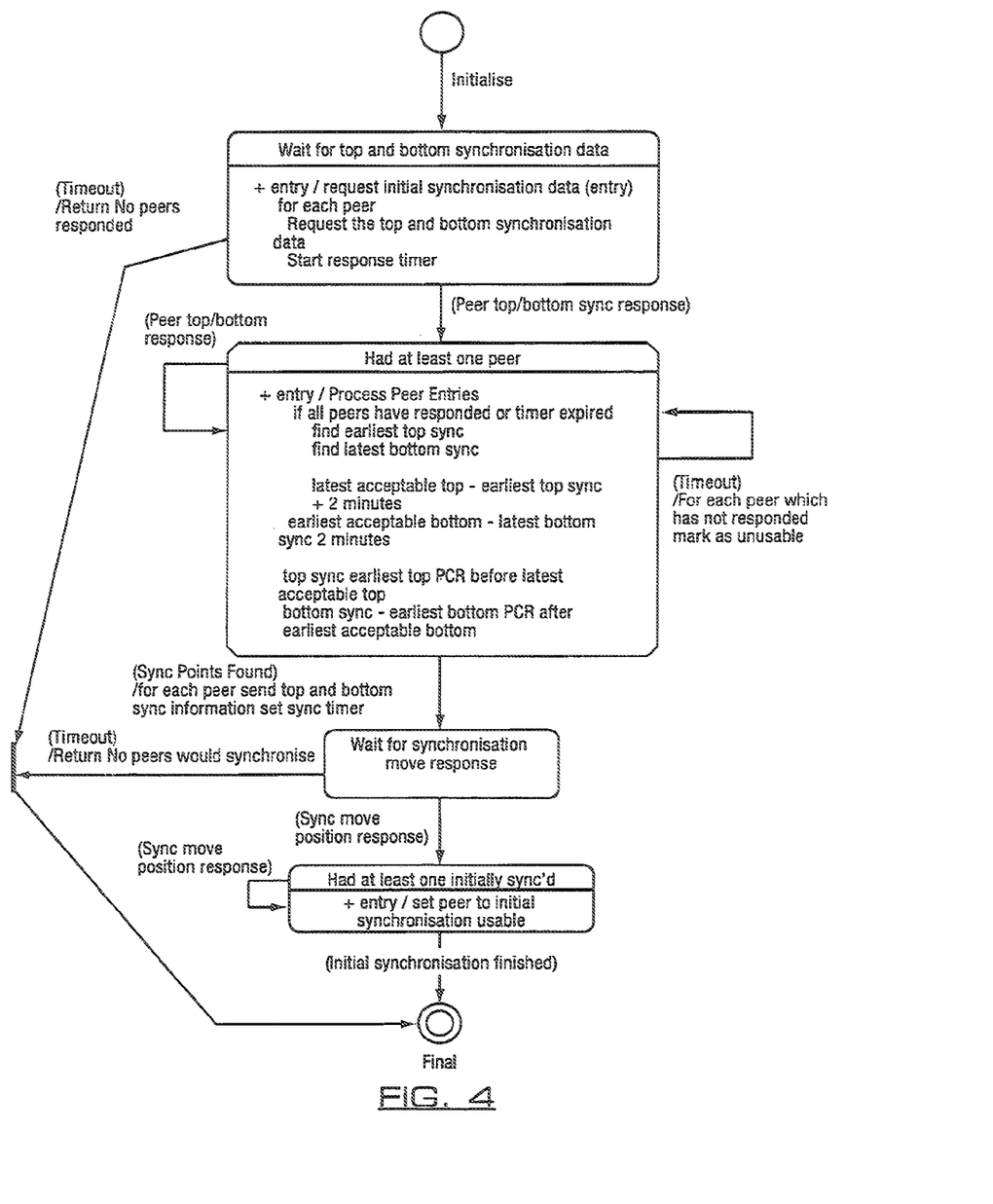
FIG. 4 illustrates an outline flow diagram of the initial synchronization process for the uploading peer.

After the start and end points are selected by the downloading peer, they are sent to all the peers which hold the content, and these boundary points are used to define the start and endpoints for the file in the swarm. Any peer which is unable to synchronies with the start and end points is marked as bad and is not used as part of the download. An outline flow diagram illustrating the initial synchronization process for the uploading peer is shown in FIG. 4. If a peer has downloaded the content then they do not take part in the initial synchronization calculation to ensure that there is no creep of the start and end PCR values.

To improve performance the PCR figures may be logged with the synchronization and directory server, and this information can then be made available along with the directory search response.

Figure 5:
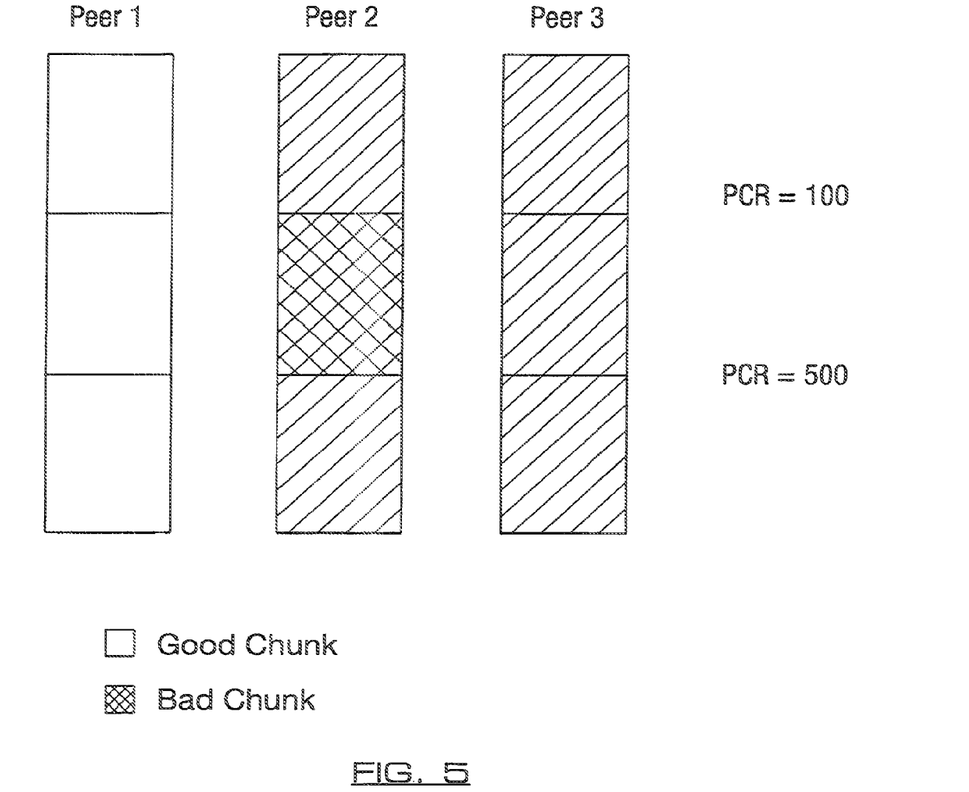
FIG. 5 illustrates the mid-file synchronization step of the method according to an embodiment of the invention.

With reference to FIG. 5, the mid-file synchronization step is illustrated, which also uses the universal reference of the PCR count in the recordings. The content is split into fixed size portions or chunks which are the same as the protocol such as BitTorrent will use.

The downloading peer needs to pick a reference recording, which is done by picking the uploading peer with the largest number of packets between the initial synchronization points (packets can generally only be lost from the recording). To determine if the peers are synchronized they return the first PCR value after the start of each chunk and its file position to the uploading peer.

If no packets are dropped then all the PCR values will have the same value for each chunk. If a packet has been dropped by a peer then the PCR value will be: higher (as the number of transport packets will have taken longer to acquire). The peer with the least dropped packets is called the reference peer, as it is assumed to have a perfect copy of the content.

It is of course possible for the reference peer to have lost a packet. In this case the chunk must come from the reference peer in order for the meta data to match the recording. It is also possible for errors to cancel out, e.g. if the reference peer loses a packet and one of the other peers loses a packet in the same chunk. This however would be detected if BitTorrent hash checking was enabled.

Figure 6:
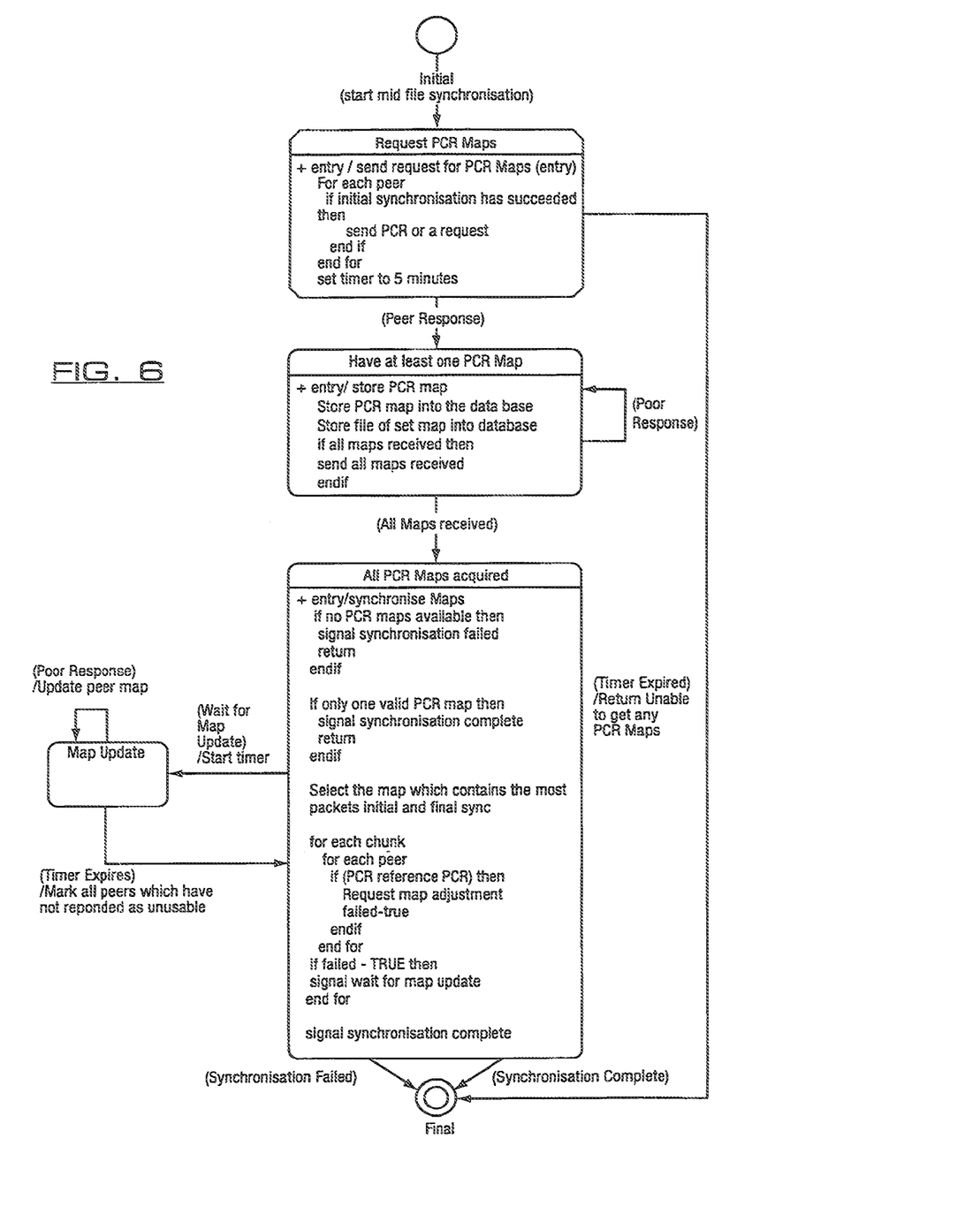
FIG. 6 illustrates an outline flow diagram illustrating mid file synchronization.

The peer with a bad chunk is sent the offset into the file that the PCR value is from the start of the chunk. The peer then adjusts its map and sends the new PCR map to the downloading peer. An outline flow diagram illustrating mid file synchronization is shown in FIG. 6.

Figure 7:
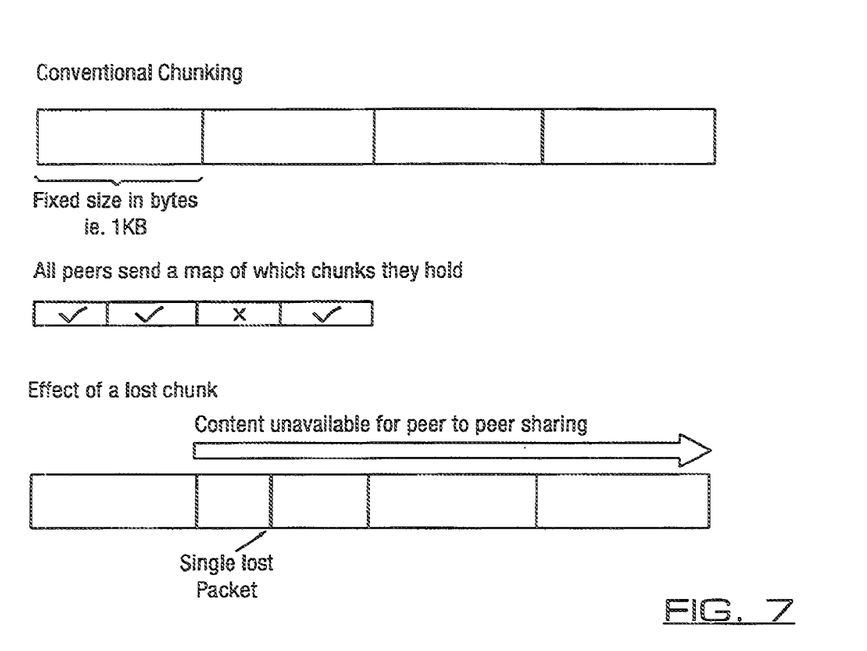
FIG. 7 illustrates the portion availability if packet loss occurs in a conventional system.

In conventional chunking, the loss of a packet in a chunk or portion causes subsequent portions to lose identity with those of other peers as the boundaries no longer correspond, as illustrated in FIG. 7.

Figure 8:
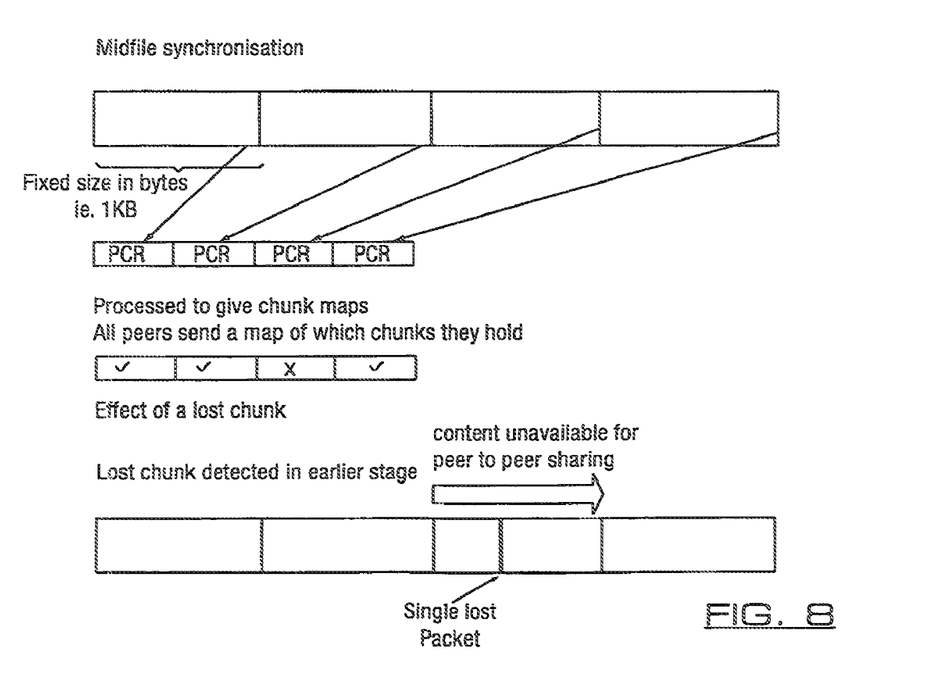
FIG. 8 illustrates the portion availability if packet loss occurs in a system using mid-file synchronization.

However, in contrast to conventional chunking, the mid-file synchronization of the invention allows the portions following an error to be maintained as available to other peers in the swarm, as the later portions maintain identity via the mid-file synchronization method, as illustration in FIG. 8.

Figure 9:
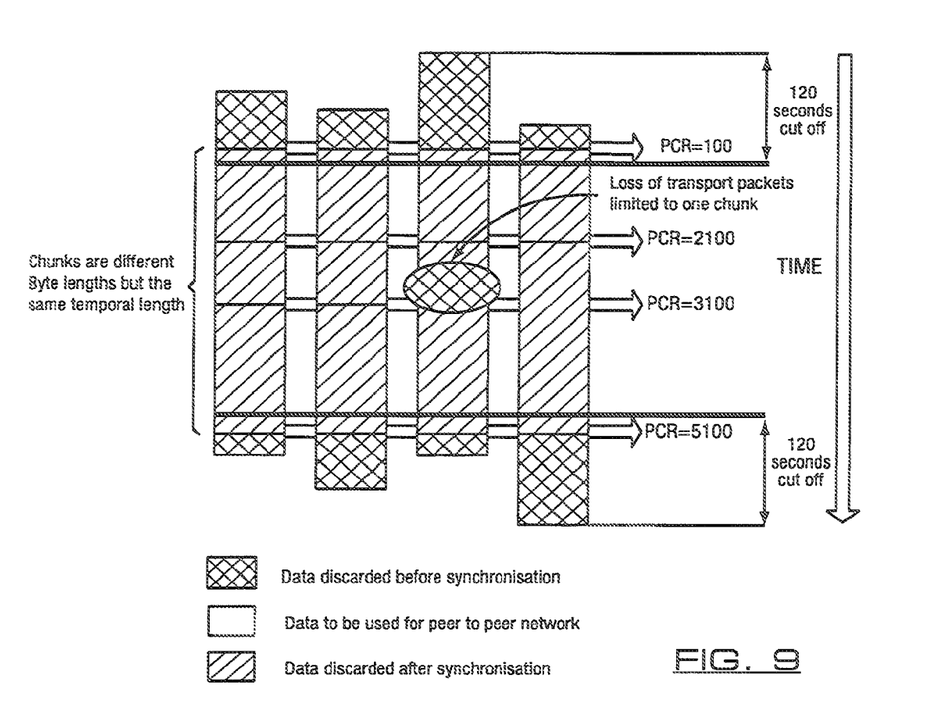
FIG. 9 illustrates a synchronization step of the method by using temporal chunking according to an embodiment of the invention.

With reference to FIG. 9, a mechanism which could be used as an alternative to the mid-file synchronization shown in FIG. 5 is to divide the file into portions or chunks by time (temporal chunking) removing the need to realign all the portions following the loss of a packet.

In this embodiment the boundary points are at regular intervals based on the PCR values. If a peer's chunk is missing packets, a gap is left before the next chunk starts. The peer does not typically advertise having this incomplete chunk available.

Figure 10:
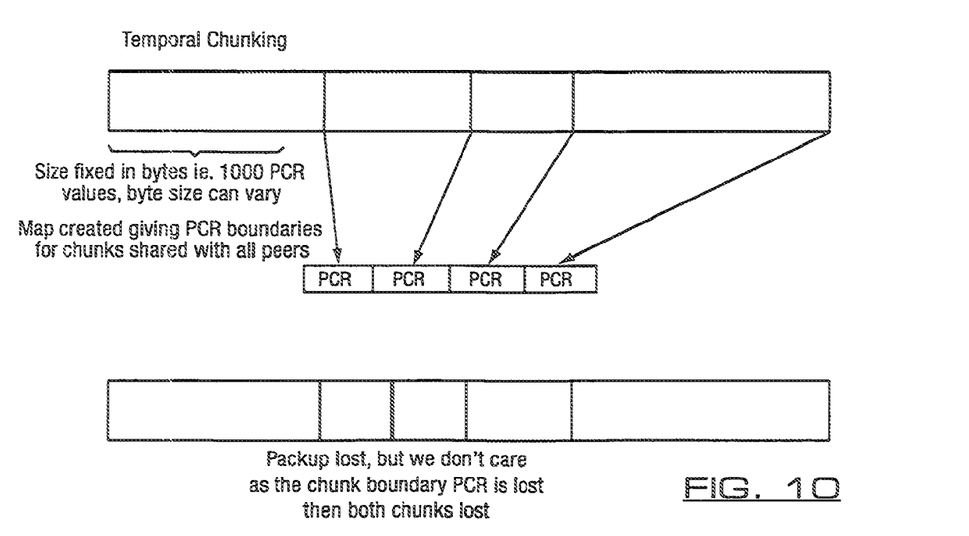
FIG. 10 illustrates the portion availability if packet loss occurs in a system using temporal chunking.

Advantageously, temporal chunking has the advantage over the fixed size method that it is robust against packet loss, as the chunk boundaries are defined by the PCR values rather than by absolute offsets from the start of the file. As illustrated in FIG. 10, the loss of a packet from a portion only affects that portion, and subsequent portions are maintained as available to peers for download.

In addition, as the PCR packets can be accessed through the recorded metadata, direct access is allowed to the chunk boundaries rather than having to search for the PCRs at the fixed length boundaries. Furthermore less network traffic is required as the inter-peer traffic is not required to provide synchronization.

For this temporal chunking method a time period is selected, which will depend on the average bit-rate of the content, to give a reasonable sized chunk of content to download from each peer. A single peer is selected to produce a chunking map, from its local copy of the content.

At each temporal boundary point, for example one minute, the peer looks for the next PCR value after that time. In systems which record meta data, the meta data could be used to save searching for PCRs in the recording.

Depending on the type of peer to peer system being implemented determines what happens to the chunking map. For example:

In BitTorrent the map would be sent to the tracker, and distributed as peers join the swarm. The peers will the use this chunk map to define the boundaries of the chunks, for calculating the hash values and for selecting which part of the file to download.

In Gnutella the map would be sent to the downloading peer, the downloading peer would use this information to formulate its HTTP GET requests to the other peers on the network.

Alternatively for a system which has central control of the peers, the map could be sent to that server, to control the download process.

One possible disadvantage of this mechanism is that the chunk size could vary significantly. However, care could be taken to ensure that the largest of the chunks are either subdivided or allocated to peers with higher bandwidth availability.

Figure 11:
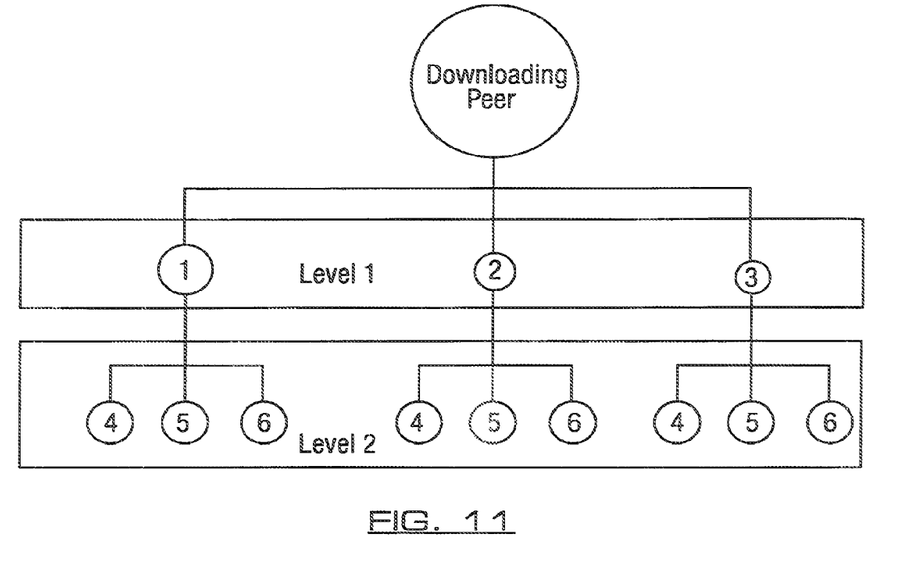
FIG. 11 illustrates the topology of a staggered synchronization method according to an embodiment of the invention.

With reference to FIG. 11, the topology of a staggered synchronization is illustrated, which helps reduce the delays that may be associated with trying to synchronies a number of BDRs due to inter-BDR communication, and due to the inherent delays caused by such communications occurring via the Internet. BDRs are synchronized in a series of levels or layers, with each new layer synchronized by the layer before it The peer which wishes to perform the download synchronizes a small number of say four first level BDRs, and at this point the swarm can be started and so the download can commence. The first level BDRs now synchronies a second level of BDRs (the IP addresses or which are provided by the Synchronization and directory server) which after synchronization join the swarm. There is no requirement for the second level BDRs to communicate any synchronization information to the downloading peer. The size of the swarm is controlled by the synchronization directory server.

It will be appreciated by persons skilled in the art that the present invention may also include further additional modifications made to the device which does not affect the overall functioning of the device.

The invention claimed is:

1. A method of synchronizing content comprising the steps of:
   receiving content via a broadcast data receiver, said broadcast data receiver connected to a network of one or more peers of further broadcast data receivers;
   storing the content on storage media;
   the content being divided into portions, the boundaries of the portions being spaced apart by a predetermined fixed portion or chunk size;
   allowing one or more received portions of the content to be shared with the peers;

at least one or more received portions is synchronized between the peers by referring to program clock reference values;

wherein the program clock reference values at the start and at the end of each portion of each peer are monitored and predetermined periods from the earliest or latest program clock reference valves are calculated from the earliest or latest values available to determine common start or end points;

wherein the peer with the least dropped packets is assigned as a reference peer against which other peers are compared, such that if a difference in a program clock reference value is detected at a boundary of one or more of the portions, the broadcast data receiver receiving content sends the difference to the corresponding serving peer such that subsequent portions can be offset by said difference.

2. A method according to claim 1 wherein program clock reference values increase sequentially every 0.1 seconds.

3. A method according to claim 1 wherein the broadcast data receiver receiving the content determines an earliest and/or latest program clock reference value for content available from the peers.

4. A method according to claim 3 wherein the broadcast data receiver receiving content the calculates a predetermined period from said earliest and/or latest program clock reference value or values to determine respective common start and/or end points.

5. A method according to claim 4 wherein the predetermined period is 60 seconds.

6. A method according to claim 4 wherein the start and/or end points are sent to the peers, thereby defining the content to be made available by the peers in a swarm for synchronization.

7. A method according to claim 4 wherein a peer is marked as unavailable if it is unable to synchronize the start and/or end points.

8. A method according to claim 7 wherein the program clock reference values are stored in an index file.

9. A method according to claim 1 wherein a portion is subdivided into smaller portions if the size of the portion reaches a threshold size.

10. A broadcast data receiver comprising:
receiving means for receiving broadcast content;
communication means for connecting to a network of one or more peers of further broadcast data receivers;
storage means for storing the content;
the available content being divided into portions, the boundaries of the portions being spaced apart by a predetermined fixed portion or chunk size;
processing means for dividing the content into one or more portions;
the content being shareable by the peers, at least one portion being synchronized between the peers by referring to program clock reference values, wherein the program clock references values at the start and the end of each portion of each peer are monitored and predetermined periods from the earliest or latest program clock reference values are calculated from the earliest or latest values available to determine common start or end points;
wherein a peer with the least dropped packets is assigned as a reference peer against which other peers are compared, such that if a difference in a program clock reference value is detected at a boundary of one or more of the portions, the broadcast data receiver receiving content sends the difference to the corresponding peer such that subsequent portions can be offset by said difference.

11. A method of synchronizing content comprising the steps of:
receiving content via a receiver;
storing the content;
dividing the content into portions, the boundaries of the portions being spaced apart by a predetermined fixed portion or chunk size;
allowing one or more received portions of the content to be shared by at least one further receiver;
at least one portion being synchronized between the receivers using program clock reference values wherein the program clock reference values at the start and the end portion are monitored and predetermined from the earliest or latest values available to determine common start or end points;
wherein the receiver with the least dropped packets is assigned as a reference receiver against which other receivers are compared, such that if a difference in a program clock reference value is detected at a boundary of one or more of the portions, the receiver receiving shared content sends the difference to the corresponding serving receiver such that subsequent portions on the serving receiver can be offset by said difference.

* * * * *